T. HARRINGTON.
COOKING VESSEL.
APPLICATION FILED AUG. 5, 1919.
1,349,508.
Patented Aug. 10, 1920.
2 SHEETS—SHEET 1.
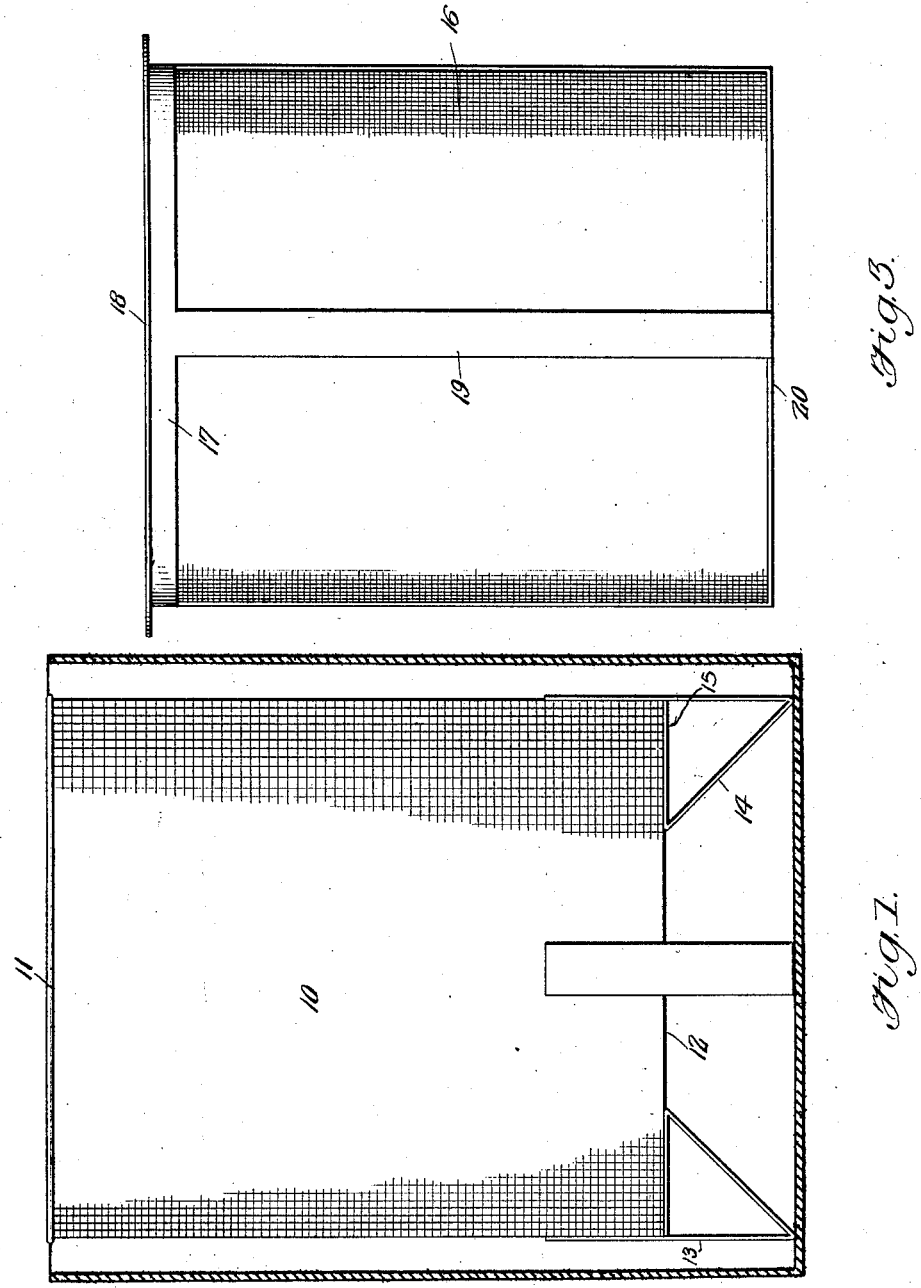
WITNESSES
INVENTOR.
Tillie Harrington,
BY
Victor J. Evans
ATTORNEY.

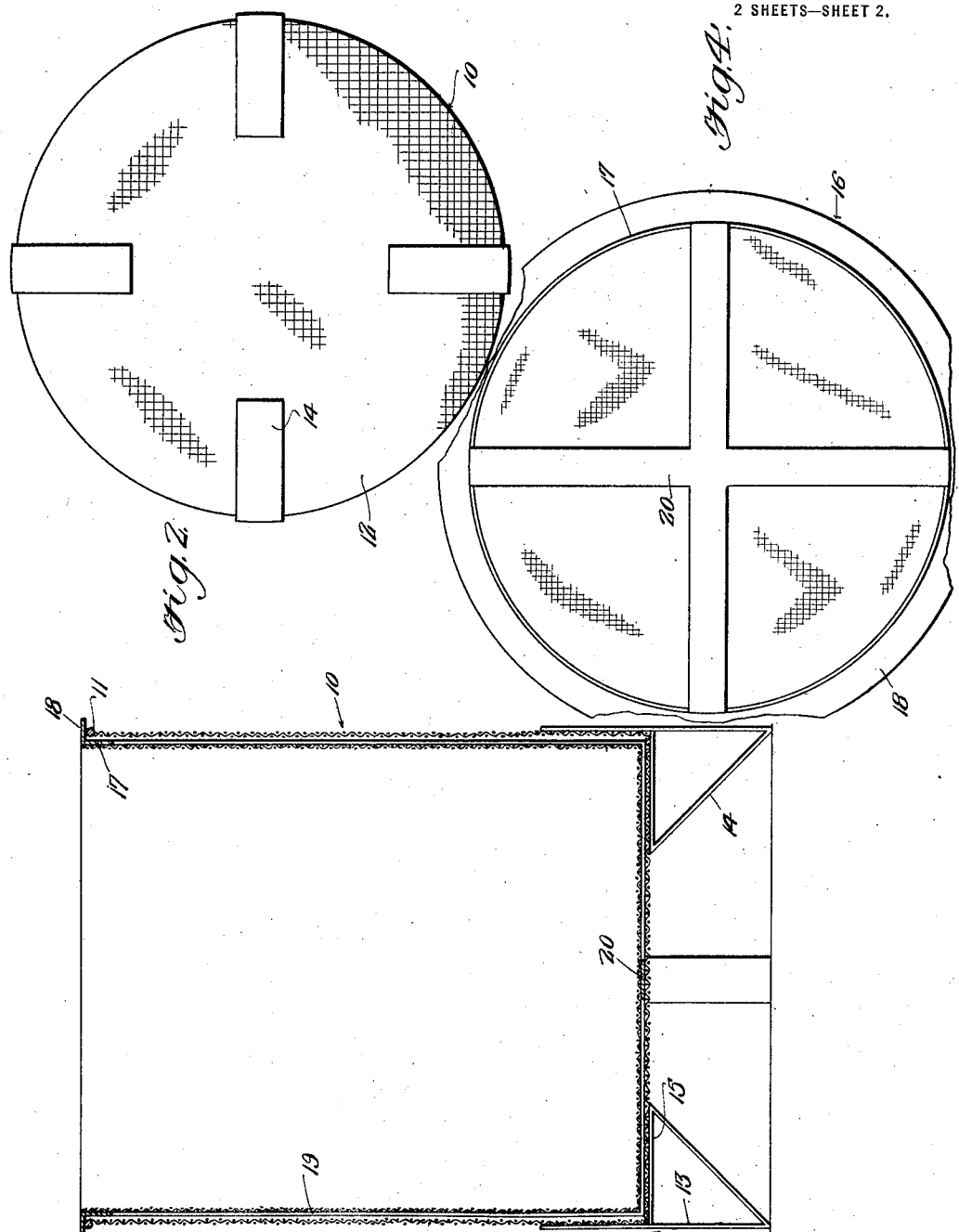

UNITED STATES PATENT OFFICE.

TILLIE HARRINGTON, OF MINNEAPOLIS, MINNESOTA.

COOKING VESSEL.

1,349,508. Specification of Letters Patent. Patented Aug. 10, 1920.

Application filed August 5, 1919. Serial No. 315,489.

*To all whom it may concern:*

Be it known that TILLIE HARRINGTON, a citizen of the United States, residing at Minneapolis, in the county of Hennepin and State of Minnesota, have invented new and useful Improvements in Cooking Vessels, of which the following in a specification.

This invention relates to cooking vessels and has for its object the provision of nested foraminous containers adapted for disposition within a kettle containing any desired liquid whereby articles placed in the foraminous container may be cooked while the danger of sticking to the sides or bottom thereof will be prevented.

An important object is the provision of a device of this character comprising in its preferred form, outer and inner foraminous containers, the outer one of which is provided with supporting legs and which may be used alone, and the inner one of which is adapted to be supported within the outer container and is of much finer mesh whereby to permit the cooking therein of grains or the like which would pass through the mesh of the outer.

An additional object is the provision of a device of this character which will be simple and inexpensive in manufacture, which will be easy to use, which consists of only two parts and which is therefore not likely to get out of order, which will be efficient and durable in use, and a general improvement in the art.

With the above and other objects and advantages in view, the invention consists in the details of construction to be hereinafter more fully described and claimed, and illustrated in the accompanying drawings, in which Figure 1 is a side elevation showing the outer section of my device, Fig. 2 is a bottom plan view thereof, Fig. 3 is a side elevation of the inner section of my device, Fig. 4 is a bottom plan view thereof, and Fig. 5 is a longitudinal sectional view showing the two sections assembled.

Referring more particularly to the drawings, the numeral 10 designates the outer section of my device which is formed as a cylinder body of suitable wire mesh reinforced at its outer edge by a hoop 11 of wire. The bottom 12 is also formed of wire mesh and is suitably secured to the body as by means of soldering. Disposed at the lower portion of this outer section are legs, each of which includes a vertical portion 13 secured upon the outer side of the body, an inclined portion 14 extending upwardly from the lower end of the vertical portion toward the center of the body, and a horizontal portion 15 extending from the upper extremity of the inclined portion to the inner face of the vertical portion. This horizontal portion is soldered upon the bottom 12.

This outer section is adapted to contain vegetables, meats, or the like which are to be cooked, and such articles are disposed within this section and the section disposed within a suitable kettle containing water, milk, broth, or the like, in which it is desired to cook the articles. Any kettle, sauce pan, boiler or other vessel may be used in connection with my device though for the sake of illustration I have shown in Fig. 1 a sectional view of a sauce pan A within which my device may be disposed. The supporting legs will hold the bottom 12 of the section out of engagement with the bottom of the kettle so that the liquid within the kettle may have free access to the materials being cooked so as to prevent any possibility of sticking and so that all portions of the articles being cooked will be properly acted upon.

When it is desired to cook beans, rice, or other fine grained articles, I make use of an inner section 16 which is of cylindrical form and which is formed of finer mesh than the outer section 10. The diameter of this inner section is less than that of the outer section so that this inner section may be disposed within the outer section, as clearly shown in Fig. 5. At its upper edge the inner section is reinforced by a band 17 of sheet metal which is provided with an outwardly extending flange 18 seating upon the top of the outer section. The inner section is also reinforced by a plurality of longitudinally extending strips 19 which are soldered or otherwise secured upon the outer periphery of the wire mesh and which extend across the bottom, as shown at 20. When the inner section is disposed within the outer section the assembled sections are placed within the kettle containing the liquid and the fine grained articles to be cooked are placed within the inner section.

From the foregoing description and a study of the drawings it will be apparent that I have thus provided a very simple device within which articles may be cooked without danger of sticking to the sides or bottom, my device being adapted for disposition within any ordinary cooking vessel. It will also be observed that the parts of my device are readily separable to facilitate cleaning so that the device will be thoroughly sanitary.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:—

1. A device of the character described comprising an outer cylindrical container formed of wire mesh and provided with supporting feet, and a removable inner container slidably disposed within said outer container and formed of wire mesh of finer screen than said outer container.

2. A device of the character described comprising an outer foraminous container provided with supporting legs, and a removable inner container slidably disposed within said outer container and formed of finer foraminous material than said outer container, a reinforcing band at the upper edge of said inner container and having formed thereon an outwardly extending flange seating upon the top of said outer container, and a plurality of strips secured externally upon said inner container and extending across the bottom thereof in intersecting relation.

In testimony whereof I affix my signature.

TILLIE HARRINGTON.